United States Patent Office 3,752,759
Patented Aug. 14, 1973

3,752,759
DEPURATION OF AN AQUEOUS SOLUTION CONTAINING VANADIUM AND COBALT SALTS AS IMPURITIES
Martin S. Burg, Western Springs, Lynn M. Carbonaro, Oak Park, and Evelyn M. Songco, Chicago, Ill., assignors to Western Electric Company, Incorporated, New York, N.Y.
No Drawing. Filed Jan. 14, 1972, Ser. No. 218,006
Int. Cl. C02b 1/26; C02c 5/02
U.S. Cl. 210—50   7 Claims

ABSTRACT OF THE DISCLOSURE

Acidified ammonium persulfate spent as etchant for vicalloy (an alloy containing cobalt, vanadium, and iron and which may also contain silicon and manganese) is treated with an iron reagent for reducing pentavalent vanadium and trivalent cobalt. The solution is then neutralized to throw down substantially all of the vanadium from the solution as insoluble salts of trivalent and tetravalent vanadium, and to remove the iron as iron hydroxide. These insoluble materials, together with any silicon dioxide, are then separated from the liquid. The pH of the resulting liquid is highly alkalinized to throw out therefrom substantially all of the cobalt and the remaining iron as insoluble materials of bivalent cobalt and iron hydroxide. These last insoluble materials are then separated from the liquid, which is thereafter neutralized.

BACKGROUND OF THE INVENTION (1) Field of the invention

The present invention relates to the treatment of liquid waste. Particularly the invention relates to depuration of ammonium persulfate solutions which have been spent in etching vicalloy. Specifically, the invention relates to removal of cobalt, vanadium and iron, which are in a highly oxidized state, from an acid solution.

(2) Description of the prior art

Vicalloy is generic (p. 405, Ferromagnetism by Bozarth, 1st ed., pub. 1951 by Van Nostrand) for alloys of the type disclosed in U.S. Pats. 2,190,667, 2,298,225 and 2,519,227. A typical vicalloy composition comprises 52% cobalt, 37.25% iron, 10% vanadium, .050% manganese and .026% silicon, and is laminated on an aluminum substrate for manufacturing magnetic memory cards. In the manufacturing process, a resist pattern which outlines magnets, is applied by heretofore known techniques on the exposed vicalloy surface. During ensuing processing, which is accelerated by heat, 92% of the vicalloy is dissolved in an aqueous etchant solution comprised of ammonium persulfate (a powerful oxidizing agent) highly acidified with sulfuric acid, for leaving a magnet patern on the substrate. Except that etched silicon will precipitate from the etchant in the form of silicon dioxide, the spent etchant will contain dissolved salts of all of the other foregoing metals of vicalloy, the metals being oxidized to their highest valence states by reason of the etching reactions.

The levels of the concentrations of the dissolved metals render the spent etchant unfit for disposal as sewer outfall, existing governmental regulations prohibiting such disposal of dissolved metals exceeding a concentration of 5 parts per million.

Controlled addition of a base to the spent ammonium persulfate solution will remove all the dissolved metals except the cobalt, whose trivalent state is complexed with ammonia to form the highly stable cobaltic hexammine ion $[Co(NH_3)_6]^{+++}$. Boiling the resulting solution to remove ammonia will liberate the cobalt ions from their complexed ammine state and cause them to precipitate out of solution as insoluble cobalt hydroxide. However, for commercial operation, an uneconomical expenditure could be entailed for an ammonia gas scrubbing installation to prevent pollution of the air with the exhaust of reaction.

It is an object of the present invention to treat liquid chemical wastes.

It is another object of the invention to depurate a spent etchant of vicalloy.

It is a further object of the invention to economically remove highly oxidized cobalt and vanadium from a solution of an oxidizing agent.

It is an additional object of the invention to recover separately cobalt and vanadium from an acid solution in which they are present in a highly oxidized state.

SUMMARY OF THE INVENTION

To effect the foregoing, and other objects of the invention which will become apparent from ensuing description, from one aspect of the invention, highly oxidized cobalt and vanadium are removed from an aqueous solution by adding a soluble reducing agent to the solution. Then, the pH of the solution is adjusted to form insoluble compounds of cobalt and vanadium.

From another aspect of the invention, an acid aqueous solution containing, as impurities, compounds of cobalt and at least one other material from the group including vanadium, iron and manganese, is depurated by adding an agent to the solution to reduce any highly oxidized cobalt and vanadium. The solution is then alkalinized in stepwise fashion and the precipitate formed is separated from the liquid.

From yet another aspect of the invention, acidified waste persulfate solution resulting from etching of an alloy containing cobalt and vanadium and at least one material from the group including iron, silicon and manganese is treated by adding finely divided iron, or ferrous sulfate, to the solution for reducing pentavalent vanadium to lower valenced vanadium and cobaltic cations to cobaltous cations. Then the pH of the solution is adjusted to a level in the range of between about 6 and 8 by adding sodium hydroxide for throwing out of solution substantially all of the vanadium as insoluble vanadium salts. Thereafter, the insoluble vanadium salts and iron hydroxides which have been thrown down during adjustment are separated from the liquid. Also, the pH of the solution is adjusted to a level in the range of about between 11 and 13 for throwing out of solution insoluble cobaltous material. Then the cobaltous material is separated from the liquid.

DETAILED DESCRIPTION

In exemplary practice of the invention, spent etchant having a pH in the range of about between .8 and 2 is collected in a storage tank from which it is removed for batchwise treatment. In accordance with the invention, trivalent cobalt ($Co^{+++}$), particularly hexammine cobaltic complexed cations and pentavalent vanadium ($Va^{+++++}$) which are originally present in the spent etchant in each batch are reduced, respectively, to bivalent cobalt cations, and lower valent vanadium.

The trivalent hexammine cobaltic cation is a stable, highly soluble ion, which will not react with a readily soluble hydroxide to form an insoluble cobaltic hydroxide. However, the cobalt can be reduced to bivalent cobalt, which will react with a hydroxide forming an insoluble cobalt hydroxide.

Pentavalent vanadium (its highest oxidized state) forms salts as vanadates and oxides which are highly soluble in both acid and alkaline solutions. On the other hand, ions containing tetravalent and trivalent vanadium will react chemically with a base to form compounds which are highly insoluble at a pH in the range of between about 6 and 8 and less insoluble at higher pH levels.

Particularly, according to the invention, a batch of spent etchant is removed from a storage tank, for example, by pumping, into a reaction tank which preferably is equipped with agitating means and a heating coil. A reducing agent is added to the spent etchant in the reaction tank, while heat is applied to the tank contents which can be agitated simultaneously. Powdered or finely divided iron is preferred because it reacts with hydrogen ions in solution, forming hydrogen molecules and ferrous ions as reducing agents. However, ferrous sulfate and ferrous ammonium sulfate are also effective.

In a first embodiment of the invention, after the reducing reaction goes to completion, an alkaline material is added to the reaction for raising the pH of the resulting reduced solution to a level in the range of between about 6 and 8. The alkaline material preferably is a solution of sodium hydroxide which is controllably transferred from a reagent tank to the reaction tank by, for example, pumping. A chemical reaction occurs, which is urged to completion by heat, as the pH is thusly elevated; and iron and manganese cations in the spent etchant are precipitated or thrown out of solution, respectively, as insoluble or particulate iron hydroxide and manganese hydroxide. Furthermore, practically all of the vanadium is precipitated or thrown out of solution in insoluble materials which may include the following: vanadyl hydroxide [$VO(OH)_2$] and vanadium hydroxide [$V(OH)_3$]. A small quantity of cobalt may be also thrown down from solution as cobaltous hydroxide [$Co(OH)_2$], at this time. However, most of the cobalt tends to remain in solution in the neutral pH range.

Following the reaction, aforesaid, the contents of the reaction tank are transferred by suitable means such as a pump, to a centrifuge in which the aforesaid insoluble materials, as well as any silicon dioxide transferred from the storage tank, will be spun down. Thereafter, separation of the insoluble material may be effected by transferring the supernatant liquid, from the centrifuge to a second reaction tank and draining the slurry of insolubles from the centrifuge into a sludge basin. The last reaction tank preferably also is equipped with means for agitating the tank contents, and a conventional heater coil.

The pH of the liquid in the last reaction tank is adjusted to a level in the range of between about 11 and 13. To that end, controlled addition of additional sodium hydroxide solution from the reagent tank is preferred. In the resulting reaction, which is facilitated by agitation and heating of the reactants, substantially all remaining iron and cobalt will be precipitated out of or thrown down from solution, respectively, as iron hydroxide and cobaltous hydroxide [$Co(OH)_2$]. For thereafter separating the particulate or insoluble materials thusly formed, from the resulting liquid, the contents of the last reaction tank are transferred by means, such as a pump, to a centrifuge in which the particulate matter is spun down. Thereafter, the supernatant liquid is transferred from the last centrifuge to a neutralizing tank and the slurry of the spun down solids may be drained into a sludge basin.

In the neutralizing tank the liquid is neutralized by reducing its pH to a level in range of about 6–8. To that end sulfuric acid solution may be controllably transferred by pumping from a reagent source to the neutralizing tank.

By reason of the foregoing process, practically all of the cobalt, vanadium, iron, manganese and silicon are removed from the spent etchant, only trace amounts of the ions containing some of said metals remaining in solution and falling within tolerable limits for disposal into the public sewer.

ALTERNATE EMBODIMENT

In an alternate embodiment of the invention, next following the reduction reaction, the pH of the spent etchant may be increased immediately to a level within the range of about 11 and 13 by adding sodium hydroxide. As a result of the ensuing reaction with the base, practically all of the cobalt, iron and manganese in the spent etchant are thrown down from or precipitated out of solution, respectively, as cobaltous hydroxide, iron hydroxide, and insoluble manganese salts. Additionally, substantial portions of the vanadium will also be thrown out of solution in various compounds. The insoluble materials are then separated from the liquid. But this supernatant liquid contains a concentration of vanadium, which is higher than the concentration of vanadium in solution following its precipitation according to the first described embodiment of the invention. Yet even this higher concentration may be sufficiently low to meet governmental requirements relating to sewer outfall.

To remove any additional vanadium, which may be dissolved, from solution, according to the alternate embodiment, the level of the pH of the last mentioned supernatant liquid is adjusted to a level in the range of between about 6 and 8 by the controlled addition of concentrated sulfuric acid solution. In consequence of the resulting neutralization reaction, substantially all of the remaining vanadium is precipitated out of or thrown down from solution as salts including the following: vanadium hydroxide [$V(OH)_3$], and vanadyl hydroxide [$VO(OH)_2$].

In each of the foregoing embodiments of the invention, the depurated etchant will contain sodium and ammonium cations and sulfate anions though some ammonium sulfate will crystallize out.

Spent etchant can be effectively treated for the removal of vanadium, cobalt, iron and manganese pursuant to the invention and in accordance with the following:

Example I

Add 21 pounds of finely divided or powdered iron to a 500 gallon batch of spent ammonium persulfate in a reaction tank equipped with a heating coil and an agitator. Heat and maintain the temperature of the contents preferably within the range between 120° F. and 150° F. for about 12 minutes while constantly agitating. Thereafter, pump 33½ pounds of sodium hydroxide in the form of a 30% solution into the reaction tank and continue agitation of the contents for an additional 12 minutes while maintaining the heat at the level aforesaid.

Transfer the resulting slurry by removing the entire contents of the reaction tank to a centrifuge. Then spin down the particulate matter in a centrifuge until solids are packed. The resulting almost dry solids are comprised of vanadium salts, iron hydroxides and a dark pink clear liquid containing cobalt. Thereafter, pump the liquid back to the reaction tank.

Next, pump 24½ pounds of sodium hydroxide in the form of a 30% solution into the reaction tank holding the dark pink liquid. Again, heat and maintain the contents of the reaction tank at a temperature preferably within the range between 120° F. and 150° F. for about 12 minutes while constantly agitating. Pump the resultant slurry to a centrifuge; and spin the slurry until the solids are separated from the liquid. A second batch of almost dry solids comprised of insoluble cobalt containing materials will separate from the second supernatant liquid. The latter will be sufficiently free of metal contaminants for permitting its discharge into the public sewer.

However, before discharge, transfer the supernatant liquid to a reaction tank and add about 16 pounds of sulfuric acid in the form of a 30% solution. The end point of this last addition will be reached in about ten minutes and is determined when a stable pH reading of between 6 and 8 is obtained.

Example II

Add 106⁴/₁₀ pounds of ferrous sulfate in the form of a saturated solution (a concentration of 1.33 pounds per gallon of water) to 500 gallons of spent ammonium persulfate etchant in lieu of the divided iron of Example I. Thereafter, follow the remainder of the steps of Example I.

Example III

Add 21 pounds of finely divided or powdered iron to a reaction tank containing a 500 gallon batch of spent ammonium persulfate. Then heat to and maintain the solution at a temperature preferably in a range between 120° F. and 150° F. for about 12 minutes while constantly stirring. Thereafter, from a reagent tank, introduce to the spent etchant 58 pounds of sodium hydroxide in the form of a 30% solution. Simultaneously, continuously agitate the contents of the reaction tank for an additional 12 minutes while maintaining the temperature in the aforesaid range. Pump the slurry which develops into a centrifuge by transferring thereto all of the contents of the reaction tank; and spin the contents of the centrifuge for a period sufficient to separate the solids from the liquid. Almost dry solids comprised of materials containing cobalt, vanadium and iron compact in the bottom of a centrifuge and the supernatant liquid will be substantially water clear.

The supernatant liquid thus formed will have metallic impurities at a level which falls within the range permitted for discharge as outflow to the public sewer. However, because the supernatant liquid then has a pH between 11 and 13, transfer the liquid again to a reaction tank. There, neutralize it with sulfuric acid in a manner provided in the final step of Example I. This last neutralization step may produce a light precipitate of some insoluble vanadium salts. In such event, these may be separated from the liquid by transferring the neutralized mass from the reaction tank to a centrifuge and spinning. Thereafter, the resultant liquid can be discharged to the public sewer.

In Examples I and II the spent etchant, following treatment with the reducing agent, is alkalinized in a stepwise fashion. In the first of these steps the pH increased to a level in the range of between about 6 and 8. In the second step the pH increased to a level in the range of between 11 and 13. On the other hand, in Example III, in a single step, the pH of the spent persulfate solution elevated from an acid condition to a level of between 11 and 13. The alkalinization procedures of Examples I and II are indicated, while the procedure of Example III is contraindicated in the event it is desired to recover the cobalt and vanadium separately for subsequent exploitation commercially.

As many modifications in the described process could be conceived, and as many widely different embodiments of the invention could be practiced without departing from the spirit and scope of the invention, it is intended that all matter contained in the accompanying specification shall be considered as illustrative only and not in a limiting sense.

What is claimed is:

1. A process treating an acidified waste persulfate solution following etching with acidified ammonium persulfate of an alloy containing cobalt and vanadium and at least one other material from the group including iron, silicon and manganese and comprising the steps of:
    adding iron containing material to said solution for reducing:
        (a) pentavalent vanadium to lower valanced vanadium, and
        (b) trivalent cobalt to bivalent cobalt;
    bringing the pH of the solution to a level in the range of between about 6 and 8 by adding NaOH for throwing down from solution insoluble compounds of vanadium;
    elevating the pH of the solution to a level in the range of between about 11 and 13 for throwing down from solution insoluble cobaltous particulate matter; and
    separating the insolubles from the liquid.

2. A process according to claim 1 wherein the iron containing material is a substance selected from the class comprised of finely divided iron, ferrous sulfate and ferrous ammonium sulfate.

3. A process according to claim 1 wherein the waste solution is heated prior to adjusting of the pH.

4. A process according to claim 1 characterized by neutralizing the liquid remaining after the removal therefrom of insolubles.

5. A process according to claim 1 characterized by removal of silicon dioxide from the liquid contemporaneously with separation of said insolubles.

6. A process according to claim 1 wherein the expedient of separating occurs in two phases, one separating phase following the step of bringing and the other separating phase following the step of elevating.

7. A process according to claim 1 characterized by removal of manganese hydroxide from the liquid contemporaneously with separation of the cobaltous particulate matter.

References Cited

UNITED STATES PATENTS

| | | | |
|---|---|---|---|
| 1,515,245 | 11/1924 | Erickson | 423—66 |
| 2,886,420 | 5/1959 | Jones et al. | 156—19 |
| 3,075,916 | 1/1963 | Heinze et al. | 423—140 |
| 3,272,738 | 9/1966 | Pitzer et al. | 210—51 |
| 3,399,090 | 8/1968 | Caropreso et al. | 134—13 X |
| 3,473,920 | 10/1969 | Fitzhugh et al. | 75—109 |
| 3,575,854 | 4/1971 | Richards | 210—50 |
| 3,600,244 | 8/1971 | Wegener | 156—19 |

SAMIH N. ZAHARNA, Primary Examiner

T. G. WYSE, Assistant Examiner

U.S. Cl. X.R.

75—109; 134—13; 210—53; 423—66, 140